United States Patent
Peek

(10) Patent No.: US 10,527,199 B2
(45) Date of Patent: Jan. 7, 2020

(54) PIPE-CLAMPING BLOCK

(71) Applicant: SHELL OIL COMPANY, Houston, TX (US)

(72) Inventor: Ralf Peek, St. Andreu de Llavaneres (ES)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/769,370

(22) PCT Filed: Oct. 20, 2016

(86) PCT No.: PCT/US2016/057818
§ 371 (c)(1),
(2) Date: Apr. 19, 2018

(87) PCT Pub. No.: WO2017/070289
PCT Pub. Date: Apr. 27, 2017

(65) Prior Publication Data
US 2018/0306347 A1    Oct. 25, 2018

Related U.S. Application Data

(60) Provisional application No. 62/244,928, filed on Oct. 22, 2015.

(51) Int. Cl.
*F16L 1/06* (2006.01)
*F16L 1/11* (2006.01)
(Continued)

(52) U.S. Cl.
CPC .............. *F16L 1/24* (2013.01); *F16L 1/123* (2013.01); *F16L 1/16* (2013.01)

(58) Field of Classification Search
CPC . E02B 3/12; E02B 3/121; E02B 3/122; E02B 3/127; E02D 29/045; E02F 5/104;
(Continued)

(56) References Cited

U.S. PATENT DOCUMENTS 2,662,552 A * 12/1953 Rowe .................. F16L 1/24
138/178
2,739,362 A * 3/1956 Young ................ B28B 7/18
249/102
(Continued)

FOREIGN PATENT DOCUMENTS

FR    2350534 A1    12/1977
FR    2432668 A1    2/1980
(Continued)

OTHER PUBLICATIONS

International Search Report and Written opinion received for PCT Application No. PCT/US2016/057818, dated Jan. 31, 2017, 10 pages.

*Primary Examiner* — Benjamin F Fiorello
*Assistant Examiner* — Edwin J Toledo-Duran

(57) ABSTRACT

A pipe-clamping mattress has a first pipe-clamping block and a second pipe-clamping block. The first and second pipe-clamping blocks have a recessed surface, which together form a cavity for receiving a subsea pipeline. A bottom surface adjacent the recessed surface of each of the first and second blocks is adapted to rest on a seafloor when the recessed surfaces of the first and second blocks are placed around the subsea pipeline.

13 Claims, 4 Drawing Sheets

(51) Int. Cl.
*F16L 1/12* (2006.01)
*F16L 1/24* (2006.01)
*F16L 1/16* (2006.01)

(58) Field of Classification Search
CPC ....... E03F 3/04; F16L 1/11; F16L 1/12; F16L 1/123; F16L 1/24; F16L 1/26; F16L 3/00; F16L 1/16
USPC ... 405/19, 20, 154, 157, 172, 158, 159, 169, 405/171; 61/113, 105, 150, 43; 138/103, 138/105, 106, 178; 114/206, 28 R, 28 A
See application file for complete search history.

(56) References Cited

U.S. PATENT DOCUMENTS

| | | | | |
|---|---|---|---|---|
| 2,791,019 A * | 5/1957 | Du Laney | B28B 21/74 | 249/124 |
| 2,936,786 A * | 5/1960 | Versoy | F16L 1/24 | 138/158 |
| 3,240,512 A * | 3/1966 | Pennington | F16L 1/24 | 285/45 |
| 3,326,000 A * | 6/1967 | Lamy | F16L 1/16 | 405/157 |
| 3,594,835 A * | 7/1971 | Wilson | F16L 1/24 | 441/133 |
| 3,779,027 A * | 12/1973 | Murphy | F16L 1/123 | 405/172 |
| 3,797,260 A * | 3/1974 | Webb | F16L 1/06 | 405/172 |
| 3,841,105 A * | 10/1974 | Cannon | F16L 1/201 | 405/172 |
| 3,933,181 A * | 1/1976 | Nilsson | F16L 1/00 | 138/105 |
| 3,993,192 A * | 11/1976 | Bunn | B65D 21/0233 | 206/515 |
| 4,110,994 A * | 9/1978 | Lundh | B63B 21/50 | 405/158 |
| 4,116,015 A * | 9/1978 | Duncan | E21B 33/038 | 24/458 |
| 4,134,563 A * | 1/1979 | Pollono | F16L 59/135 | 248/58 |
| 4,166,710 A * | 9/1979 | Spiridonov | F16L 1/06 | 138/105 |
| 4,171,174 A * | 10/1979 | Larsen | E02B 3/04 | 405/157 |
| 4,279,544 A * | 7/1981 | Brun | B63B 35/4406 | 166/346 |
| 4,318,641 A * | 3/1982 | Hogervorst | B63B 21/27 | 114/296 |
| 4,323,088 A * | 4/1982 | McClellan | F16L 59/135 | 138/106 |
| 4,338,045 A * | 7/1982 | Cour | F16L 1/20 | 138/105 |
| 4,436,450 A * | 3/1984 | Reed | F16L 1/20 | 405/171 |
| 4,444,528 A * | 4/1984 | Scodino | F16L 1/166 | 405/173 |
| 4,488,836 A * | 12/1984 | Cour | E02D 17/08 | 405/156 |
| 4,806,049 A * | 2/1989 | Cour | E02F 5/105 | 405/161 |
| 4,927,103 A * | 5/1990 | Nicholson | F16L 3/13 | 138/106 |
| 5,052,859 A * | 10/1991 | Miller | E02B 3/12 | 405/157 |
| 5,160,218 A * | 11/1992 | Hill | F16L 1/24 | 405/157 |
| 5,193,937 A * | 3/1993 | Miller | E02B 3/127 | 405/157 |
| 5,263,796 A * | 11/1993 | de Waal | F16L 1/201 | 248/49 |
| 5,443,329 A * | 8/1995 | de Geeter | F16L 1/24 | 405/172 |
| 5,603,588 A * | 2/1997 | Herbert | F16L 1/06 | 405/158 |
| 5,683,204 A * | 11/1997 | Lawther | F16L 1/16 | 405/158 |
| 5,722,795 A * | 3/1998 | Angel | F16L 1/123 | 405/158 |
| 5,944,449 A | 8/1999 | Angel et al. | | |
| 6,027,285 A * | 2/2000 | Angel | E02B 3/123 | 405/158 |
| 6,220,788 B1 * | 4/2001 | Jewell | E02D 27/38 | 405/172 |
| 6,450,736 B1 * | 9/2002 | Eck | F16L 1/0246 | 138/106 |
| 6,878,881 B1 * | 4/2005 | Henry | H02G 9/02 | 104/275 |
| 7,749,035 B2 * | 7/2010 | Oram | F16L 1/24 | 405/171 |
| 7,862,256 B2 * | 1/2011 | Sprague | F16L 1/24 | 405/171 |
| 8,262,320 B2 * | 9/2012 | Gunn | F16L 1/24 | 383/24 |
| 8,657,529 B2 * | 2/2014 | Ohkubo | E02D 15/10 | 405/154.1 |
| 8,974,147 B1 * | 3/2015 | Webb | F16L 1/24 | 405/157 |
| 9,004,813 B2 * | 4/2015 | Al-Buraik | F17D 5/02 | 405/158 |
| 2011/0158747 A1 * | 6/2011 | Ohkubo | H02G 9/025 | 405/157 |
| 2012/0020738 A1 * | 1/2012 | Wegener | H02G 9/06 | 405/157 |
| 2013/0029548 A1 * | 1/2013 | Stenzel | B63B 21/66 | 441/133 |
| 2013/0115009 A1 * | 5/2013 | Mebarkia | E21B 43/01 | 405/171 |
| 2013/0287499 A1 * | 10/2013 | Fraczek | F16L 1/20 | 405/171 |
| 2013/0327412 A1 * | 12/2013 | DeGeorge | B23P 11/00 | 137/15.01 |
| 2014/0248086 A1 * | 9/2014 | Rolf | F16L 1/207 | 405/158 |
| 2015/0078825 A1 * | 3/2015 | Messina | E02B 3/06 | 405/19 |
| 2016/0377197 A1 * | 12/2016 | Larsen | F16L 1/235 | 405/171 |

FOREIGN PATENT DOCUMENTS

| | | |
|---|---|---|
| FR | 2716251 A1 | 8/1995 |
| WO | 3911055 A1 | 11/1989 |

* cited by examiner

PIPE-CLAMPING BLOCK

PRIORITY CLAIM

The present application is the National Stage (§ 371) of International Application No. PCT/US2016/057818, filed Oct. 20, 2016, which claims benefit of priority from U.S. Application No. 62/244,928, filed Oct. 22, 2015 incorporated herein by reference.

BACKGROUND

The present disclosure relates to a mattress for subsea pipelines. More specifically, in certain embodiments the present disclosure relates to a pipe-clamping mattress for subsea pipelines and associated methods and system.

In the production of oil and gas from subsea hydrocarbon formations, pipelines are often used to transport the oil and gas along the seafloor. These pipelines can extend over large distances. During production, these pipelines may have a tendency to move or "walk" due to thermal expansion and contraction of the pipelines. This movement of the pipeline can cause many problems, especially at connection points where the pipeline connects to subsea equipment, including pipeline end termination facilities, pumps, and manifolds.

Several methods and devices have been proposed to mitigate the effects of pipeline walking. These methods include the use of rock-dumps and the use of pipeline mattresses to secure the pipeline in place. However, these solutions may not always be optimal. Rock-dumps and conventional mattresses have a tendency of driving a subsea pipeline into soft seafloors when they are installed. As the pipeline works its way into the seafloor, the ability of the rock-dump or conventional mattress to restrict the movement of the pipeline is reduced. Additionally, conventional mattresses also have a tendency of arching over pipelines, reducing their ability to hold down a pipeline.

It is desirable to develop a subsea pipeline mattress capable of restraining a subsea pipeline against axial movements without driving the subsea pipeline into the seafloor.

SUMMARY

The present disclosure relates to a mattress for subsea pipelines. More specifically, in certain embodiments the present disclosure relates to a pipe-clamping mattress for subsea pipelines and associated methods and system.

In one embodiment, the present disclosure provides a pipe-clamping block comprising a top surface, a first outside surface, a second outside surface, a bottom surface, a first inside surface, a second inside surface, and a recessed surface.

In another embodiment, the present disclosure provides a pipe-clamping mattress comprising: a first pipe-clamping block comprising a recessed clamping surface and a second pipe-clamping block comprising a recessed clamping surface, wherein the first pipe-clamping block is connected to the second pipe-clamping block.

In another embodiment, the present disclosure provides a pipe-clamping mattress system comprising: a subsea pipeline disposed on a seafloor and a pipe-clamping mattress comprising, a first pipe-clamping block comprising a recessed clamping surface and a second pipe-clamping block comprising a recessed clamping surface, wherein the first pipe-clamping block is connected to the second pipe-clamping block and wherein the subsea pipeline is disposed within a cavity defined by the recessed clamping surface of the first pipe-clamping block and the recessed clamping surface of the second pipe-clamping block.

In another embodiment, the present disclosure provides a method comprising: providing a subsea pipeline on a sea floor and installing a pipe-clamping mattress above the subsea pipeline, wherein the pipe-clamping mattress comprising: a first pipe-clamping block comprising a recessed clamping surface and a second pipe-clamping block comprising a recessed clamping surface, wherein the first pipe-clamping block is connected to the second pipe-clamping block.

BRIEF DESCRIPTION OF THE DRAWINGS

A more complete and thorough understanding of the present embodiments and advantages thereof may be acquired by referring to the following description taken in conjunction with the accompanying drawings.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates to a mattress for subsea pipelines. More specifically, in certain embodiments the present disclosure relates to a pipe-clamping mattress for subsea pipelines and associated methods and system.

One potential advantage of the pipe-clamping mattresses described herein is that they are less likely to drive a subsea pipeline into the seafloor than conventional mattresses. Another potential advantage of the pipe-clamping mattresses described herein is that they are capable of clamping on to a subsea pipeline rather than just resting on top of the subsea pipeline. Another potential advantage of the pipe-clamping mattresses described herein is that they do not require an anchor flange relying instead on friction with the pipe over a considerable length of pipe. Another potential advantage of the pipe-clamping mattresses described herein is that they are able to clamp on to a subsea pipeline while contacting the seafloor without driving the subsea pipeline into the sea floor.

Figure 1:
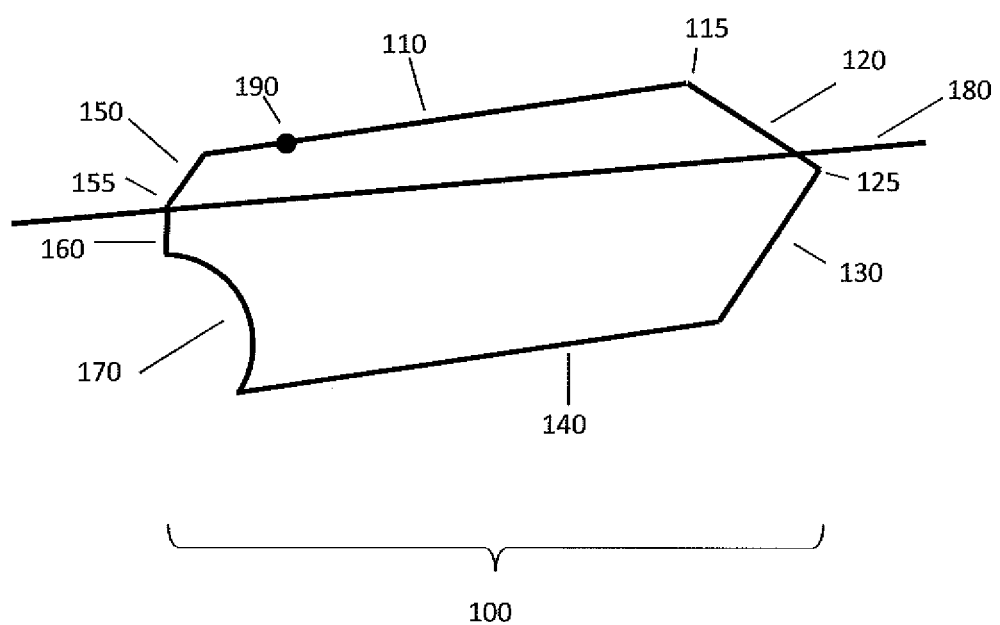
FIG. 1 is an illustration of a pipe-clamping block for a pipe-clamping mattress in accordance with certain embodiments of the present disclosure.

In certain embodiments, the present disclosure provides a block for a pipe-clamping mattress. Referring now to FIG. 1, FIG. 1 illustrates pipe-clamping block 100. In certain embodiments, pipe-clamping block 100 may comprise a concrete block. In certain embodiments, pipe-clamping block 100 may comprise any combination of any features of any element described in U.S. Pat. No. 5,944,449, the entirety of which is hereby incorporated by reference.

In certain embodiments, pipe-clamping block 100 may comprise a cross-sectional shape. In certain embodiments, the cross-sectional shape of pipe-clamping block 100 may be any geometric shape comprising recessed clamping surface 170. In certain embodiments, recessed clamping surface 170 may define a cavity. In certain embodiments, pipe-clamping block 100 may have a length in the range of from 1 to 5 meters along an axial direction of the cross-sectional shape. In certain embodiments, pipe-clamping block 100 may have a length in the range of from 2 to 3 meters along an axial direction of the cross-sectional shape. In certain embodiments, pipe-clamping block 100 may have a thickness in the range of from 0.2 meters to 2 meters. In certain embodiments, pipe-clamping block 100 may have a thickness in the range of from 0.3 meters to 1.2 meters.

In certain embodiments, pipe-clamping block 100 may comprise top surface 110, first outside surface 120, second outside surface 130, bottom surface 140, first inside surface 150, second inside surface 160, and/or recessed clamping surface 170.

In certain embodiments, top surface 110 may have a length in the range of from 1 meter to 5 meters. In certain embodiments, top surface 110 may have a length of 2 meters. In certain embodiments, bottom surface 140 may have a length in the range of from 0.5 meters to 4 meters. In certain embodiments, bottom surface 140 may have a length in the range of from 1 meter to 2 meters. In certain embodiments, top surface 110 may have a greater length than bottom surface 140 to allow for a greater clamping force to be generated by the pipe-clamping block when placed onto a subsea pipeline. In certain embodiments, top surface 110 may have a length that is at least 50% greater than the length of bottom surface 140. In certain embodiments, top surface 110 may have a length that is at least 100% greater than the length of bottom surface 140. In certain embodiments, top surface 110 and bottom surface 140 are parallel surfaces. In other embodiments, top surface 110 and bottom surface 140 are not parallel surfaces.

In certain embodiments, first outside surface 120 may have a length in the range of from 0.01 meters to 0.1 meters. In certain embodiments, first outside surface 120 may have a length in the range of from 0.02 meters to 0.04 meters. In certain embodiments, top surface 110 and first outside surface 120 may define an angle. In certain embodiments, the angle may be 90 degrees. In other embodiments, the angle may be an angle in the range of from 90 degrees to 135 degrees. In certain embodiments, first outside surface 120 may interest with top surface 110 at a loading edge 115.

In certain embodiments, second outside surface 130 may have a length in the range of from 0.5 meters to 4.5 meters. In certain embodiments, second outside surface 130 may have a length that is equal to the length of first outside surface 120. In certain embodiments, second outside surface 130 may have length in the range of from 0.02 meters to 0.04 meters. In certain embodiments, second outside surface 130 may have a length that is at least equal to 75% of the difference of lengths between the length top surface 110 and bottom surface 140. In certain embodiments, second outside surface 130 may have length in the range of from 1 meter to 4.5 meters. In certain embodiments, second outside surface 130 may have a length in the range of from 1.5 meters to 3 meters.

In certain embodiments, first outside surface 120 and second outside surface 130 may define an angle. In certain embodiments, the angle may be an angle in the range of from 45 degrees to 135 degrees. In other embodiments, the angle may be an angle in the range of from 70 degrees to 110 degrees. In certain embodiments, first outside surface 120 may intersect with second outside surface 130 at a flex point 125.

In certain embodiments, second outside surface 130 and bottom surface 140 may define an angle. In certain embodiments, the angle may be the same as the angle defined by top surface 110 and first outside surface 120. In certain embodiments, the angle may be 90 degrees. In other embodiments, the angle may be an angle in the range of from 90 degrees to 135 degrees. In certain embodiments, the angle may be in the range of from 135 degrees to 165 degrees.

In certain embodiments, first inside surface 150 may have a length in the range of from 0.01 meters to 0.2 meters. In certain embodiments, top surface 110 and first inside surface 150 may define an angle. In certain embodiments, the angle may be the same angle that top surface 110 and first outside surface 120 define. In other embodiments, the angle may be an angle in the range of from 90 degrees to 135 degrees.

In certain embodiments, second inside surface 160 may have a length in the range of from 0.01 meters to 0.1 meters. In certain embodiments, second inside surface 160 may have a length that is less than the length of first inside surface 150. In certain embodiments, second inside surface 160 may have length in the range of from 0.01 meters to 0.2 meters.

In certain embodiments, first inside surface 150 and second inside surface 160 may define an angle. In certain embodiments, the angle may be an angle in the range of from 90 degrees to 155 degrees. In other embodiments, the angle may be an angle in the range of from 120 degrees to 125 degrees. In certain embodiments, first inside surface 150 may intersect with second inside surface 160 at a flex point 155.

In certain embodiments, recessed surface 170 may be a curved surface. In certain embodiments, recessed surface 170 may have a cross-sectional geometry of a semi-circle. In certain embodiments, recessed surface 170 may have a cross-sectional geometry of a circular arc. In certain embodiments, the circular arc may have a central angle in the range of from 60 degrees to 120 degrees. In certain embodiments, the circular arc may have a central angle in the range of from 80 degrees to 120 degrees. In certain embodiments, the circular arc may have a radius in the range of from 0.1 meters to 1.3 meters. In certain embodiments, the circular arc may define a circular sector cavity. In other embodiments, recessed surface 170 may be a partially curved surface.

In other embodiments, not illustrated in FIG. 1, recessed surface 170 may comprise a plurality of semi-surfaces. In certain embodiments, recessed surface 170 may comprise 5 to 30 semi-surfaces. In certain embodiments, each semi-surface may comprise a center point. In certain embodiments, each center point may be arranged in a semi-circle geometry. In certain embodiments, each center point may be arranged in a semi-circle geometry wherein the semi-circle has a radius in the range of from 0.1 meters to 1.3 meters.

In certain embodiments, the length of recessed surface 170 may depend on the radius of the semi-circle and the degree of the semi-circle. In certain embodiments, the length of each semi-surface may depend on the number of semi-surfaces and the length of recessed surface 170.

In certain embodiments, recessed surface 170 may be padded. In certain embodiments, the padding may be an interference padding may comprise a rubber or a similar material with groves included to allow the rubber to expand in the direction tangent to the surface 170 as it is compressed in the direction normal to the surface 170. In certain embodiments, the padding may have a thickness in the range of from 10 mm to 50 mm.

In certain embodiments, pipe-clamping block 100 may have a geometry that allows pipe-clamping block 100 to clamp onto a subsea pipeline resting on a sea floor after two pipe-clamping blocks 100 are lowered on top of the subsea pipeline and downward force is applied to pipe-clamping blocks 100. In certain embodiments, the subsea pipeline may be partially disposed within the circular sector cavities of the pipe-clamping blocks 100. In certain embodiments, the downward force may be due to the weight of pipe-clamping blocks 100. In certain embodiments, the downward force may be applied to top surfaces 110 and/or loading edges 115. In certain embodiments, the downward force may be applied to top surface 110s and/or loading edges 115 by placing an object, such as an upper mattress, on top of pipe-clamping blocks 100.

In certain embodiments, pipe-clamping block 100 may further comprise cable 180 passing through the body of pipe-clamping block 100. In certain embodiments, cable 180 may comprise any conventional wire cables passing through the body of conventional concrete blocks used to stabilize subsea pipelines. In certain embodiments, cable 180 may exit pipe-clamping block 100 at and/or near flex point 125 and/or flex point 155. In certain embodiments, cable 180 may comprise embedded cables or polypropylene ropes. In other embodiments, not illustrated in FIG. 1, pipe-clamping block 100 may comprise one or more hinges at and/or near flex point 125 and/or flex point 155.

In certain embodiments, pipe-clamping block 100 may comprise one or more lift points 190. In certain embodiments, the lift points 190 may permit pipe-clamping block 100 to be lifted from or lowered to a sea floor.

In certain embodiments, not illustrated in FIG. 1, pipe-clamping block 100 may further comprise one or more holes. In certain embodiments, the one or more holes in pipe-clamping block 100 may reduce the weight of pipe-clamping block 100.

Figure 2:
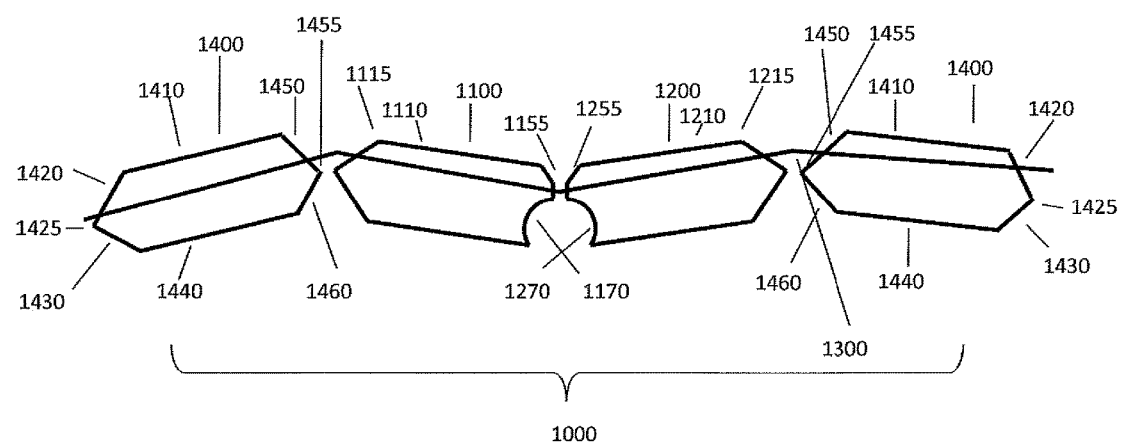
FIG. 2 is an illustration of pipe-clamping mattress in accordance with certain embodiments of the present disclosure.

Referring now to FIG. 2, FIG. 2 illustrates a pipe-clamping mattress 1000 in accordance with certain embodiments of the present disclosure. In certain embodiments, pipe-clamping mattress 1000 may comprise first pipe-clamping block 1100 and a second pipe-clamping block 1200. In certain embodiments, first pipe-clamping block 1100 may comprise any combination of features discussed above with respect to pipe-clamping block 100. In certain embodiments, first pipe-clamping block 1100 may comprise recessed surface 1170 and a flex point 1155. In certain embodiments, second pipe-clamping block 1200 may comprise recessed surface 1270 and a flex point 1255. In certain embodiments, not illustrated in FIG. 2, first pipe-clamping block 1100 may comprise a plurality of holes. In certain embodiments, not illustrated in FIG. 2, second pipe-clamping block 1200 may comprise a plurality of holes. In certain embodiments, the plurality of holes may be arranged in a number of columns and/or rows throughout first pipe-clamping block 1100 and/or second pipe-clamping block 1200. In certain embodiments, the plurality of holes in first pipe-clamping block 1100 and/or the plurality of holes in second pipe-clamping block 1200 may reduce the weight of pipe-clamping mattress 1000.

In certain embodiments, first pipe-clamping block 1100 and second pipe-clamping block 1200 may be connected to each other by a cable 1300. In certain embodiments, a portion of cable 1300 may be disposed within first pipe-clamping block 1100 and/or second pipe-clamping block 1200. In certain embodiments, cable 1300 may pass into first pipe-clamping block 1100 and second pipe-clamping block 1100 at and/or near flex points 1155 and 1255. In other embodiments, not illustrated in FIG. 2, first pipe-clamping block 1100 and second pipe-clamping block 1200 may be connected to each other by hinges located at and/or near flex points 1155 and 1255.

In certain embodiments, first pipe-clamping block 1100 and second pipe-clamping block 1200 may be oriented such that recessed surface 1170 of first pipe-clamping block 1100 is adjacent to recessed surface 1270 of second pipe-clamping block 1200. In certain embodiments, first pipe-clamping block 1100 and second pipe-clamping block 1200 may be oriented such that flex points 1155 and 1255 are a distance in the range of from 0.03 meters to 0.15 meters apart.

In certain embodiments, first pipe-clamping block 1100 and second pipe-clamping block 1200 may be connected to each other in a manner that allows each block to clamp onto a subsea pipeline when pipe-clamping mattress 1000 is placed on top of a subsea pipeline. In certain embodiments, pipe-clamping mattress 1000 may have a geometry that allows for pipe-clamping blocks 1100 and/or 1200 to clamp onto a subsea pipeline resting on a sea floor pipe when clamping mattress 1000 is lowered on top of the subsea pipeline and downward force is applied to pipe-clamping mattress 1000. In certain embodiments, the subsea pipeline may be partially disposed within the circular sector cavities of pipe-clamping blocks 1100 and 1200. In certain embodiments, the downward force may be due to the weight of pipe-clamping mattress 1000. In certain embodiments, the downward force may be applied to top surfaces 1110 and 1210 and/or loading edges 1115 and 1215. In certain embodiments, the downward force may be applied to top surfaces 1110 and 1210 and/or loading edges 1115 and 1215 by placing an object on top of pipe-clamping mattress 1000.

In certain embodiments, pipe-clamping mattress 1000 may have a geometry that allows for a subsea pipeline to be partially lifted from the sea floor when pipe-clamping mattress 1000 clamps onto the subsea pipeline. In certain embodiments, pipe-clamping mattress 1000 may have a geometry that permits the bottom surfaces of pipe-clamping mattress to rest on a sea floor when pipe-clamping mattress 1000 clamps onto a subsea pipeline.

In certain embodiments, pipe-clamping mattress 1000 may further comprise one or more outer blocks 1400. In certain embodiments, as shown in FIG. 2, pipe-clamping mattress 1000 may comprise a first outer block 1400 connected to first pipe-clamping block 1100 and a second outer block 1400 connected to a second pipe-clamping block 1200. In other embodiments, not shown in FIG. 2, pipe-clamping mattress 1000 may comprise a series of outer blocks 1400 connected to first pipe-clamping block 1100 and/or a series of outer blocks 1400 connected to second pipe-clamping block 1200.

In certain embodiments, outer block 1400 may comprise a concrete blocks comprising any combination of any features of any element described in U.S. Pat. No. 5,944,449. In certain embodiments, outer block 1400 may comprise a cross-sectional shape.

In certain embodiments, outer block 1400 may have a length of from 0.5 to 3 meters along an axial direction of the cross-sectional shape. In certain embodiments, outer block 1400 may have a length in the range of from 2 to 3 meters along an axial direction of the cross-sectional shape. In certain embodiments, outer block 1400 may have a thickness in the range of from 0.5 meters to 0.7 meters. In certain embodiments, outer block 1400 may have a thickness in the range of from 0.04 meters to 0.1 meters.

In certain embodiments, outer block 1400 may comprise a top surface 1410, a bottom surface 1440, first outside surface 1420, second outside surface 1430, first inside surface 1450, and second inside surface 1460.

In certain embodiments, top surface 1410 and/or bottom surface 1440 may have a length in the range of from 1 meter to 5 meters. In certain embodiments, top surface 1410 and/or bottom surface 1440 may have a length of 2 meters. In certain embodiments, top surface 1410 and bottom surface 1440 are parallel surfaces. In other embodiments, top surface 1410 and bottom surface 1440 are not parallel surfaces.

In certain embodiments, first outside surface 1420, second outside surface 1430, first inside surface 1450, and/or second inside surface 1460 may have a length in the range of from 0.1 meters to 0.3 meters. In certain embodiments, first outside surface 1420, second outside surface 1430, first inside surface 1450, and/or second inside surface 1460 may have a length in the range of from 0.02 meters to 0.04 meters. In certain embodiments, top surface 1410 and first outside surface 1420 may define an angle. In certain embodiments, the angle may be 90 degrees. In other embodiments, the angle may be an angle in the range of from 90 degrees to 135 degrees.

In certain embodiments, first outside surface 1420 and second outside surface 1430 may define an angle. In certain embodiments, the angle may be an angle in the range of from 45 degrees to 135 degrees. In other embodiments, the angle may be an angle in the range of from 70 degrees to 110 degrees. In certain embodiments, first outside surface 1420 may interest with second outside surface 1430 at a flex point 1425.

In certain embodiments, second outside surface 1430 and bottom surface 1440 may define an angle. In certain embodiments, the angle may be the same as the angle defined by top surface 1410 and first outside surface 1420. In other embodiments, the angle may be an angle in the range of from 90 degrees to 135 degrees.

In certain embodiments, top surface 1410 and first inside surface 1450 may define an angle. In certain embodiments, the angle may be the same angle that top surface 1410 and first outside surface 1420 define. In other embodiments, the angle may be an angle in the range of from 90 degrees to 135 degrees.

In certain embodiments, first inside surface 1450 and second inside surface 1460 may define an angle. In certain embodiments, the angle may be the same angle that top surface 1410 and first inside surface 1450 define. In certain embodiments, the angle may be an angle in the range of from 90 degrees to 155 degrees. In certain embodiments, first inside surface 1450 may interest with second outside surface 1460 at a flex point 1455.

In certain embodiments, outer block 1400 may be connected to pipe-clamping block 1100 and/or pipe-clamping block 1200 by cable 1300. In certain embodiments, cables 1300 may pass through the body of pipe-clamping block 1400. In certain embodiments, cable 1300 may exit the wire cables may exit outer block 1400 at and/or near flex point 1425 and/or flex point 1455. In other embodiments, not illustrated in FIG. 2, outer block 1400 may comprise one or more hinges at and/or near flex point 1425 and/or flex point 1455 connecting one or more outer blocks 1400 to pipe-clamping block 1100 and/or pipe-clamping block 1200.

Figure 3:
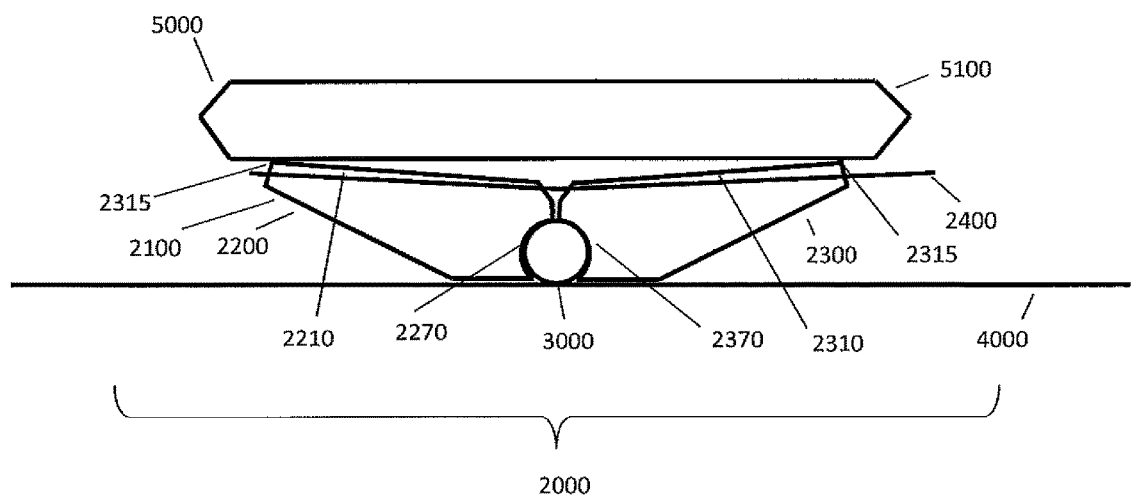
FIG. 3 is an illustration of a pipe-clamping mattress system in accordance with certain embodiments of the present disclosure.

Referring now to FIG. 3, FIG. 3 illustrates a pipe-clamping mattress system 2000. In certain embodiments, pipe-clamping mattress system 2000 may comprise pipe-clamping mattress 2100, subsea pipeline 3000, and sea floor 4000. In certain embodiments, pipe-clamping mattress 2100 may comprise any combination of features discussed above with respect to pipe-clamping mattress 1000.

In certain embodiments, as shown in FIG. 3, pipe-clamping mattress 2100 may comprise first pipe-clamping block 2200 connected to a second pipe-clamping block 2300 by one or more cables 2400. In certain embodiments, first pipe-clamping block 2200 may comprise any combination of features discussed above with respect to pipe-clamping block 100 and/or first pipe-clamping block 1100. In certain embodiments, first pipe-clamping block 2200 may comprise a recessed surface 2270 defining a circular sector cavity and a loading edge 2215. In certain embodiments, second pipe-clamping block 2300 may comprise any combination of features discussed above with respect to pipe-clamping block 100 and/or second pipe-clamping block 1200. In certain embodiments, second pipe-clamping block 2300 may comprise a recessed surface 2370 defining a circular sector cavity and a loading edge 2315. In certain embodiments, one or more cables 2400 may comprise any combination of features discussed above with respect to cable 180 and/or 1300. In certain embodiments, pipe-clamping mattress 2100 may be articulated only in a direction perpendicular to the axis of the subsea pipeline 3000.

In certain embodiments, subsea pipeline 3000 may be resting on sea floor 4000. In certain embodiments, pipe-clamping mattress 2100 may be clamped onto subsea pipeline 3000. In certain embodiments, subsea pipeline 3000 may be partially disposed within the circular sector cavities defined by recessed surface 2170 and recessed surface 2270. In certain embodiments, recessed surface 2170 and/or recessed surface 2270 may apply a clamping force to subsea pipeline 3000. In certain embodiments, the clamping force applied by recessed surface 2170 and/or recessed surface 2270 may be generated from a downward force acting upon pipe-clamping mattress 2100. In certain embodiments, the downward force may be due to the weight of pipe-clamping mattress 2100. In certain embodiments, the downward force may be applied to top surfaces 2210 and 2310 and/or loading edges 2215 and 2315. In certain embodiments, the downward force may be applied to top surfaces 2210 and 2310 and/or loading edges 2215 and 2315 by placing an upper mattress on top of pipe-clamping mattress 1000. In certain embodiments, the clamping force may be capable of partially lifting subsea pipeline 3000 off of sea floor 4000. In certain embodiments, pipe-clamping mattress 2100 may clamp onto subsea pipeline 3000 while contacting sea floor 4000 without driving subsea pipeline 3000 into sea floor 4000.

In certain embodiments, pipe-clamping mattress system 2000 may further comprise upper mattress 5000. In certain embodiments, upper mattress 5000 may comprise a series logs 5100 connected by one or more cables.

In certain embodiment, each of the logs 5100 may be comprise a hexagonal cross section. In certain embodiments, each of the logs 5100 may have a width in the range of from 0.25 meters to 1 meter. In certain embodiments, each of the logs may have a length of from 2 meters to 20 meters. In certain embodiments, each of the logs may have a length that is greater than the distance between loading edges 2315 and 2215. In certain embodiments, each of the logs may have a length that is less than twice the distance between loading edges 2215 and 2315. In certain embodiments, upper mattress 5000 may comprise 3 to 12 logs 5100.

In certain embodiments, the one or more cables connected the series of logs 5100 may comprise any conventional wire cable or synthetic rope used in conventional subsea mattresses. In certain embodiments, the one or more cables may pass through the body of each of the logs 5100.

In certain embodiments, upper mattress 5000 may span the entire length of pipe-clamping mattress 2100. In certain embodiments, upper mattress 5000 may contact pipe-clamping mattress 2100 at loading edges 2215 and 2315. In certain embodiments, upper mattress 5000 may be articulated. In certain embodiments, upper mattress 5000 may be articulated only in a direction normal to the axis of subsea pipeline 3000. In certain embodiments, not illustrated in FIG. 3, upper mattress 5000 may contact pipe-clamping mattress 2100 on inner edges of the outer blocks.

In certain embodiments, upper mattress 5000 may generated a downward force on pipe-clamping mattress 2100. In certain embodiments, the downward force may generate a pipe-clamping force on subsea pipeline 3000.

In certain embodiments, not illustrated in FIG. 3, pipe-clamping mattress system 2000 may comprise a pipe-clamping mattress bank comprising a plurality of pipe-clamping mattresses 2100 each clamped onto subsea pipeline 3000. In certain embodiments, an upper mattress 5000 may rest on top of each pipe-clamping mattress 2100 in the pipe-clamping mattress bank. In certain embodiments, not illustrated in FIG. 3, pipe-clamping mattress system 2000 may comprise a plurality of pipe-clamping mattress banks, each spaced a distance of 400 meters or more apart.

Figure 4:
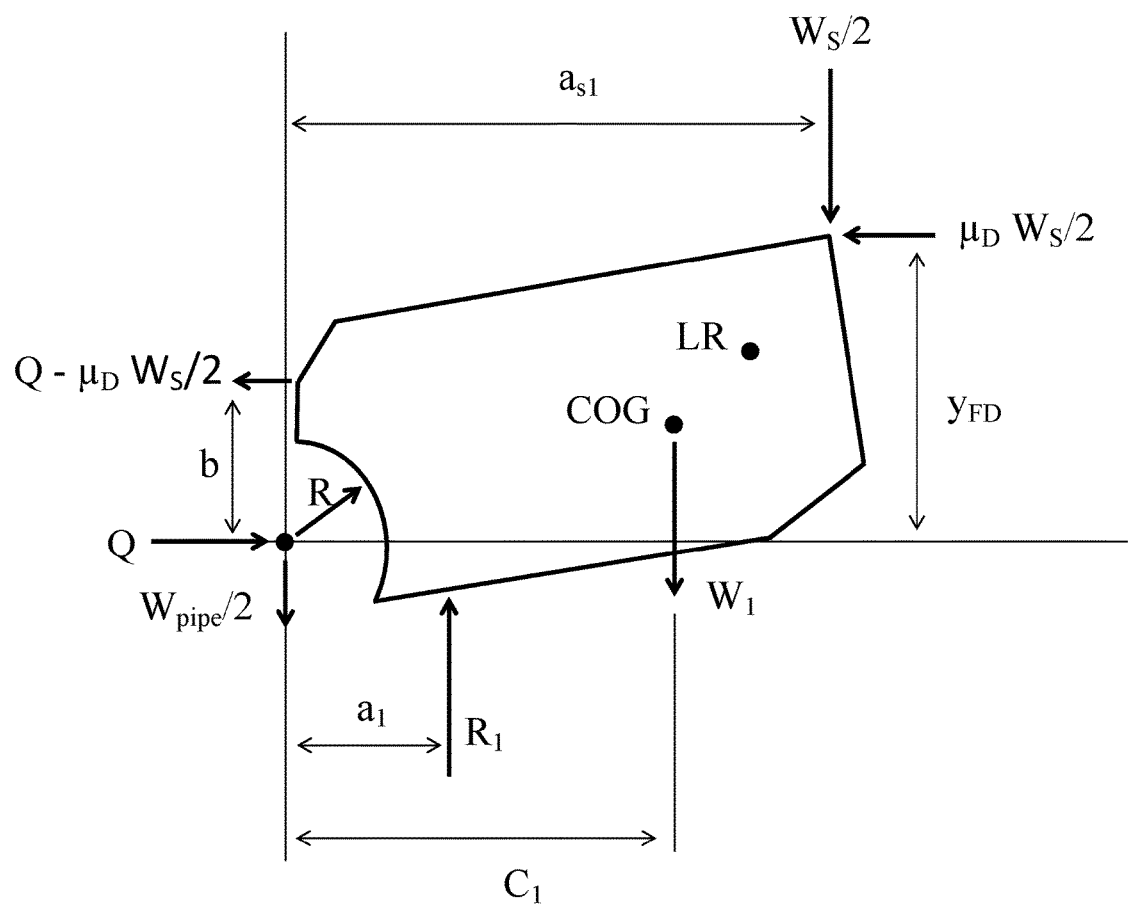
FIG. 4 is a force diagram illustrating the clamping forces of a pipe-clamping block in accordance with certain embodiments of the present disclosure.

Referring now to FIG. 4, FIG. 4 illustrates a free body diagram showing the forces generated by the clamping action of the pipe-clamping block. In certain embodiments, the pipe-clamping block may comprise any pipe-clamping block discussed above with respect to pipe-clamping blocks 100, 1100, and/or 1200. In FIG. 4, the pipe-clamping force applied by the pipe-clamping block can be calculated according to equation (1):

$$Q=[W_1 c_1 + \tfrac{1}{2} W_s(a_{s1}-\mu_D y_{FD})-R_1 a_1]/b \qquad (1)$$

where, $W_1$ is weight of the pipe-clamping block; $c_1$ is the distance from the center line of the pipe to the center of gravity of the pipe-clamping block; $W_s$ is the weight of the upper mattress; $a_{s1}$ is the distance from the loading edge of the pipe-clamping block to the vertical plane through the center line of the pipe; $y_{FD}$ is the distance from the loading edge of the pipe-clamping block to the horizontal plane through the center line of the pipe; $\mu_D$ is dimensionless force coefficient; $R_1 = W_1 + \tfrac{1}{2} W_s + \tfrac{1}{2} W_{pipe}$; $W_{pipe}$ is the submerged weight of the pipe; and b is the distance from the flex point of the pipe-clamping block to the vertical plane through the center line of the pipe.

In certain embodiments, the present disclosure provides a method comprising: providing a subsea pipeline on a seafloor and placing a pipe-clamping mattress on top of the subsea pipeline.

In certain embodiments, the subsea pipeline may comprise any type of subsea pipeline discussed above with respect to subsea pipeline 3000. In certain embodiments, the seafloor may comprise any type of seafloor discussed above with respect to seafloor 4000. In certain embodiments, the pipe-clamping mattress may comprise any pipe-clamping mattress discussed above with respect to pipe-clamping mattress 1000 and/or 2100.

In certain embodiments, placing the pipe-clamping mattress on top of the subsea pipeline may comprise lowering the pipe-clamping mattress onto the subsea pipeline. In certain embodiments, the pipe-clamping mattress may be lowered onto the subsea pipeline by attaching the pipe-clamping mattress to an installation frame, positioning the pipe-clamping mattress so that the subsea pipeline is between the first pipe-clamping block of the pipe-clamping mattress and the second pipe-clamping block of the pipe-clamping mattress, and lowering the pipe-clamping mattress and the installation frame until the recessed surface of the clamping mattress contact the subsea pipeline.

In certain embodiments, the method may further comprise disconnecting the pipe-clamping mattress from the installation frame. In certain embodiments, the method may further comprise allowing the pipe-clamping mattress to clamp the subsea pipeline. In certain embodiments, the pipe-clamping mattress may clamp onto the subsea pipeline while resting on the sea floor without driving the subsea pipeline into the seafloor. In certain embodiments, the method may further comprise partially lifting the subsea pipeline while allowing the pipe-clamping mattress the clamp the subsea pipeline. In certain embodiments, the method may further comprise laying an upper mattress on top of the pipe-clamping mattress. In certain embodiments, the method may further comprise placing a second pipe-clamping mattress on the subsea pipeline.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations and/or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A pipe-clamping device for restraining movement of a subsea pipeline on a seafloor, the pipe-clamping device comprising a first block and a second block, each of the first block and the second block having a top surface, a first outside surface, a second outside surface, a bottom surface, a first inside surface, a second inside surface, and a recessed surface, wherein:
    the first inside surface is contiguous with the top surface and the second inside surface whereby a first flex point is defined between the first inside surface and the second inside surface;
    the second outside surface is contiguous with the first outside surface and the bottom surface whereby a second flex point is defined between the first outside surface and the second outside surface; and
    the recessed surface of each of the first block and the second block together form a cavity for receiving the subsea pipeline and the bottom surface of each of the first block and the second block is adjacent to a base of the recessed surface, whereby the bottom surfaces are adapted to rest on a seafloor when the recessed surfaces of the first block and the second block are placed around the subsea pipeline.

2. The pipe-clamping device of claim 1, wherein the cavity is a circular sector cavity.

3. The pipe-clamping device of claim 1, wherein the pipe-clamping device has a length in a range of from 1 to 5 meters.

4. The pipe-clamping device of claim 1, wherein the first block and the second block each have a thickness in a range of from 0.2 meters to 2 meters.

5. The pipe-clamping device of claim 1, wherein the recessed surface is padded.

6. The pipe-clamping device of claim 1, wherein the top surface has a length that is at least 50% greater than a length of the bottom surface.

7. The pipe-clamping device of claim 1, wherein the second outside surface has a length that is at least equal to 75% of a difference of lengths between the top surface and the bottom surface.

8. The pipe-clamping device of claim 1, wherein the top surface and the bottom surface are parallel surfaces.

9. The pipe-clamping device of claim 1, wherein the bottom surface and the second outside surface define an angle, wherein the angle is an angle in a range of from 135 degrees to 165 degrees.

10. The pipe-clamping device of claim 1, wherein the first flex point is defined by an angle in a range of from 90 to 155 degrees between the first inside surface and the second inside surface.

11. The pipe-clamping device of claim 1, wherein the first flex point is defined by an angle in a range of from 120 to 125 degrees between the first inside surface and the second inside surface.

12. The pipe-clamping device of claim 1, wherein the second flex point is defined by an angle in a range of from 45 to 135 degrees between the first outside surface and the second outside surface.

13. The pipe-clamping device of claim 1, wherein the second flex point is defined by an angle in a range of from 70 to 110 degrees between the first outside surface and the second outside surface.

* * * * *